United States Patent

[11] 3,621,131

| [72] | Inventor | Hanns H. Wolff<br>Orlando, Fla. |
| --- | --- | --- |
| [21] | Appl. No. | 878,697 |
| [22] | Filed | Nov. 21, 1969 |
| [45] | Patented | Nov. 16, 1971 |
| [73] | Assignee | The United States of America as represented by the Secretary of the Navy |

[54] VISUAL ENVIRONMENT SIMULATOR
5 Claims, 1 Drawing Fig.

[52] U.S. Cl. .................... 178/6.8, 35/11
[51] Int. Cl. ................. H04n 7/18
[50] Field of Search ......... 35/11, 12 N, 25, 178/6.8, DIG. 1

[56] References Cited

UNITED STATES PATENTS 3,517,121  6/1970  Petrocelli et al. ............. 35/25 X

OTHER REFERENCES

IBM Technical Disclosure Bulletin, " Earth Sighting Simulator," Vol. 8, No. 1, June, 1965 pages 128– 130

Primary Examiner—Robert L. Griffin
Assistant Examiner—Richard K. Eckert, Jr.
Attorneys—Richard S. Sciascia, John W. Pease and John F. Miller ABSTRACT: In an electronic synthesizer used in a periscope simulator training device wherein a composite picture of movable targets and a background scene is synthesized on a television display, electrically or mechanically operated optical means are used to shift the area on the background scene observed by a background camera. Means are provided to synchronize the electronic target moving means with the movement of the optical means.

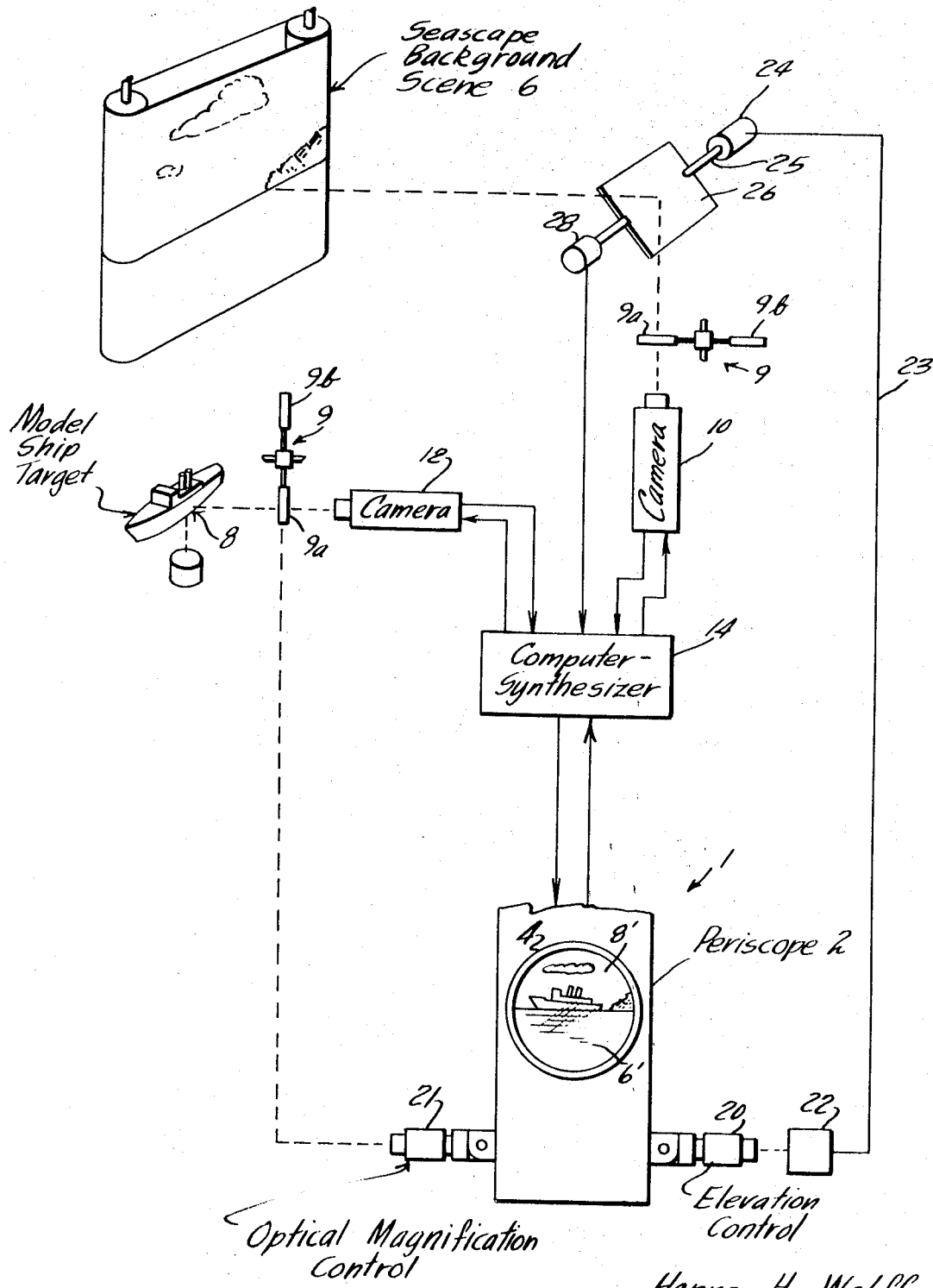

VISUAL ENVIRONMENT SIMULATOR

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

The invention taught herein may be used with the apparatus taught in applicant's applications, Ser. Nos. 535,659 filed Mar. 14, 1966; now U.S. Pat. No. 3,479,454; Ser. No. 612,770 filed Jan. 27, 1967; now U.S. Pat. No. 3,507,989; issued Apr. 26, 1970; Ser. No. 613,980 filed Feb. 1, 1967; now U.S. Pat. No. 3,507,990 issued Apr. 21, 1970; and U.S. Pat. No. 3,420,953, issued Jan. 7, 1969.

BACKGROUND OF THE INVENTION

This invention is in the field of training devices such as are used to simulate an environment useful for training personnel to operate various devices. It has particular utility in a device used to train submarine periscope operators.

In an electronic synthesizer-type visual-environment simulator such as is described in the aforementioned applications, a composite scene is synthesized by electronic means and displayed on a television display at a station where a trainee may practice control of a particular device. In a submarine periscope trainer a synthesizer is used to create a scene comprising a seascape background and a plurality of periscope targets such as ships, planes, etc. A trainee may manipulate a simulated periscope to observe targets at various azimuths and elevations. Heretofore, it has been necessary for the camera used to scan the seascape-background scene to scan the entire background continuously in order for a trainee to be able to observe a target at any position on the background or to use only part of the scannable camera area. This resulted in a loss of resolution in the background displayed. The problem was most acute when detailed background scenes were employed. The invention solves this problem of the prior art by using a novel combination of electro-optical means to limit the area of background scanned by the background camera to a periscope eye view which can be positioned anywhere on a large background.

SUMMARY OF THE INVENTION

An electronic synthesizer-type visual-environment simulator synthesizes the video outputs of a background camera and a plurality of target cameras into a composite picture of targets moving against the background on a television display screen. To enable target motion against a background it has heretofore been necessary for the background camera to scan a large background scene, with a consequent loss of resolution in the background displayed.

The invention provides increased background resolution by limiting the background camera scan to a relatively small area of the background scene. This area is projected onto the background camera by a rotatable mirror which is rotated manually or by synchro means connected to an elevation control on the periscope. Rotation of the mirror has the effect of elevating (or lowering) the periscope line of sight. An angle encoder responds to mirror rotation to forward elevation information to a computer incorporated in the electronic synthesizer. This information is used to electronically shift target images in a direction and to a distance commensurate with the mirror rotation.

BRIEF DESCRIPTION OF THE DRAWING

The drawing illustrates the principles of the invention.

DESCRIPTION OF THE PREFERRED EMBODIMENT

The invention is designed for use primarily with an electronic synthesizer-type training device, but has utility in other environments. An electronic synthesizer, as is known in the art, is an apparatus which utilizes television, computing, optical, and other techniques to generate a dynamic scene, generally comprising stationary and mobile objects. In military training devices, such synthesizers may be used to generate a background scene with moving objects such as gunnery or torpedo targets in the foreground. In the aforementioned applications various embodiments of a synthesizer utilized in a submarine periscope trainer are described. Typically, several television cameras are arranged to survey respective movable objects such as ships, submarines, aircraft, etc., and a seascape background scene to derive video information which is combined into a composite picture of the background and movable objects. This composite picture is displayed at a mockup of a periscope operator's station in a submarine.

In the drawing such an environment is shown as comprising a periscope operator's station 1 arranged to resemble a typical periscope installation on a submarine. A periscope tube 2 contains a television display screen 4 or a mirrored image thereof, on which a trainee periscope operator observes a composite picture comprising a display of a seascape background scene 6' and a display of a target such as ship 8'. Background scene 6 may be on a movable roller mounted belt as shown to obtain a lateral shift of the background. Display 4 is located inside of tube 2 and is observed through an eyepiece, not shown. Background scene 6 is observed by a television camera 10 and a ship 8 is a model observed by a camera 12. Cameras 10 and 12 feed video information into a computer synthesizer 14 which combines the information and furnishes it to the television display 4. Several model targets and cameras may be used. The aforementioned structure is described in detail in the cited applications.

In this invention, an elevation control 20 which is used to adjust the periscope line of sight in a vertical plane may be attached to periscope tube 2. Elevation control 20 is connected to operate a synchro transmitter 22. Synchro transmitter 22 is connected by a line 23 to a synchro receiver 24. Synchro receiver 24 is arranged to rotate a shaft 25 to which a mirror 26 is fixed so that when synchro receiver 24 is operated, mirror 26 is rotated in the optical path between background scene 6 and background camera 10. When elevation control 20 is adjusted, the position of mirror 26 is adjusted by means of the described linkages to change the elevation of the area on scene 6 observed by camera 10. Only that part of background scene 6 which simulates the field of view of a periscope is observed by camera 10. This enables a trainee to practice various exercises requiring a change in elevation of the line of sight of the periscope without the loss of resolution which heretofore occurred. This loss of resolution was brought about by the necessity of projecting the entire background scene 6 onto camera 10 in the prior art apparatus. This was necessary to provide a background with sufficient elevation to enable any appreciable movement of the periscope line of sight in a vertical direction.

The mirror 26 is connected to an angle converter 28 which is in turn connected to the computer synthesizer 14. The signal developed by angle converter 28 when mirror 26 is rotated is fed to 14 which will order camera 12 to shift the image of model ship target 8 on the screen of display 4 in a direction to be commensurate with the movement of the area of background 6 scanned by camera 10. This is accomplished electronically in the manner taught in applicant's U.S. Pat. No. 3,420,953. One target and target camera are shown by way of example. There may be any number. Instead of adjusting the position of mirror 26 by means of a synchro system 22-24, a direct control by mechanical linkage between control 20 and mirror 26 may be provided.

A change of periscope magnification may be made by operating a lens changing system 9 to substitute a high power lens system 9b for a low power lens system 9a by operating an optical magnification control 21 attached to periscope 2. 21 is shown connected by a dashed line to lens system 9 at camera 12 only by way of example, however 21 operates to change the lens at all cameras simultaneously. High power lens system 9b can be used to examine the target and background minutely.

It should be understood that the principles of the invention can be employed in simulating lateral or other movement of the periscope. For example, mirror 26 could be mounted in gimbals and controlled by two or more synchro systems to obtain displacement of the observed portion of the background in any direction. However in the preferred embodiment, lateral movement of the background observed is obtained by moving the background scene supporting belt on its rollers as shown. This movement can be computer controlled.

What is claimed is:

1. In an electronic synthesizer-type periscope view simulator training device having a plurality of television cameras for observing a plurality of targets and a background scene, a television display mounted in a periscope tube, and synthesizer means including a computer for synthesizing a composite picture of said targets and said background on said television display from the video outputs of said cameras, the improvement comprising:

a background camera arranged to observe said background,
a mirror rotatably mounted in the optical path between said background and said background camera to project a selected part of said background onto the lens of said background camera;
angle-converting means connected to said mirror for converting an angle of rotation into an electrical signal, said angle-converting means being connected to supply said electrical signal to said computer, means connecting said computer to said plurality of cameras and to said display to control said plurality of cameras and said display, the arrangement being such that said computer causes said cameras and said display to effect a shift of the image of said targets in said composite picture in response to said electrical signal.

2. The apparatus of claim 1 and including:

synchro means for rotating said mirror to change said selected part of said background projected onto the lens of said camera whereby the background in said composite picture is shifted, and control means on said periscope tube for controlling said synchro means.

3. The apparatus of claim 2 wherein said angle converting means and said synchro means are attached to said mirror so that said angle converter develops an electrical signal proportional to the rotation of said mirror, said computer controlling said cameras and said display so that the shift of the image of said targets in said composite picture is proportional to the shift of the observed background in said composite picture effected by rotation of said mirror.

4. The apparatus of claim 3 wherein the rotation of said mirror is reversible to raise or lower the selected observed area of said background whereby the apparent line of sight of said periscope is raised or lowered in accordance with the direction of rotation of said mirror.

5. The apparatus of claim 4 wherein the image of said targets in said composite picture is shifted a distance proportional to and in a direction opposite to the shift of said selected part of said background.

* * * * *